(12) United States Patent
Kim et al.

(10) Patent No.: US 12,115,909 B2
(45) Date of Patent: *Oct. 15, 2024

(54) VIRTUAL SOUND GENERATION APPARATUS, SYSTEM INCLUDING THE SAME, AND METHOD THEREOF

(71) Applicants: Hyundai Motor Company, Seoul (KR); Kia Corporation, Seoul (KR)

(72) Inventors: Ki Chang Kim, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 169 days.

This patent is subject to a terminal disclaimer.

(21) Appl. No.: 17/947,897

(22) Filed: Sep. 19, 2022

(65) Prior Publication Data
US 2023/0331150 A1     Oct. 19, 2023

(30) Foreign Application Priority Data
Apr. 13, 2022   (KR) .................. 10-2022-0045847

(51) Int. Cl.
  *B60Q 9/00*   (2006.01)
  *B60Q 5/00*   (2006.01)
  *G06F 3/16*   (2006.01)
  *G10K 15/02*  (2006.01)
(52) U.S. Cl.
  CPC ............... *B60Q 9/00* (2013.01); *B60Q 5/008* (2013.01); *G06F 3/165* (2013.01); *G10K 15/02* (2013.01)

(58) Field of Classification Search
  None
  See application file for complete search history.

(56) References Cited

U.S. PATENT DOCUMENTS

2013/0158795 A1*  6/2013  Hahne ............... B60Q 5/008
                                                        701/36
2022/0355732 A1   11/2022  Kim et al.

FOREIGN PATENT DOCUMENTS

| KR | 101744716 B1 | 6/2017 |
| KR | 101856935 B1 | 5/2018 |
| KR | 102131390 B1 | 7/2020 |
| KR | 10-2022-0150692 A | 11/2022 |

* cited by examiner

*Primary Examiner* — John F Mortell
(74) *Attorney, Agent, or Firm* — Fox Rothschild LLP

(57) ABSTRACT

A virtual sound generation apparatus is provided. The virtual sound generation apparatus includes a first sensor configured to obtain biometric information about a passenger, an output device configured to output a virtual sound, and a processor electrically connected with the first sensor and the output device. The processor is configured to determine driving sensibility for the passenger based on electroencephalogram (EEG) obtained by the first sensor, generate an effect signal for guiding the passenger to be stimulated depending on the driving sensibility, and control the output of the virtual sound based on the effect signal.

18 Claims, 15 Drawing Sheets

VIRTUAL SOUND GENERATION APPARATUS, SYSTEM INCLUDING THE SAME, AND METHOD THEREOF

CROSS-REFERENCE TO RELATED APPLICATION

This application claims under 35 U.S.C. § 119 (a) the benefit of and priority to Korean Patent Application No. 10-2022-0045847, filed in the Korean Intellectual Property Office on Apr. 13, 2022, the entire contents of which are incorporated herein by reference.

BACKGROUND

1. Technical Field

The present disclosure relates to a virtual sound generation apparatus, a system including the same, and a method thereof, and more particularly, relates to technologies for improving driving satisfaction of a driver by generating a virtual sound based on driving sensibility of the driver and a driving state of a vehicle.

2. Description of Related Art

In general, a motor is provided as a power source in an eco-friendly vehicle such as an electric vehicle.

Because the engine produces almost no noise when the electric vehicle is driven by the electric motor, unlike when a vehicle is driven by an internal combustion engine, although the electric vehicle is turned on, a driver of the electric vehicle may not know whether the electric vehicle is in a drivable state. Furthermore, because pedestrians around the electric vehicle may not even recognize the approaching of the electric vehicle even while the electric vehicle is traveling, there is a possibility that a safety accident may occur.

Thus, a virtual engine sound system for allowing pedestrians to easily recognize a vehicle approaching state by playing and outputting virtual noise to the outside of the electric vehicle is applied to the electric vehicle.

In general, the virtual engine sound system simply outputs a sound for recognizing the electric vehicle, for example, may adjust and output volume of a virtual sound similar to an engine sound or a sound source in which the engine sound is recorded, depending on a speed of the electric vehicle. Thus, a passenger feels a sense of difference from the actual engine sound.

SUMMARY

The present disclosure has been made to address the above-mentioned background description of the related art while advantages achieved by the related art are maintained intact.

An aspect of the present disclosure provides a virtual sound generation apparatus for improving driving satisfaction of a driver based on a driving sensibility of the driver and a driving state of a vehicle, a system including the same, and a method thereof.

Another aspect of the present disclosure provides a virtual sound generation apparatus for generating a sound to experience psychological stability or pleasure based on driving sensibility of a driver and a driving state of a vehicle, a system including the same, and a method thereof.

The technical problems to be addressed by the present disclosure are not limited to the aforementioned problems, and any other technical problems not mentioned herein will be clearly understood from the following description by those skilled in the art to which the present disclosure pertains.

According to an aspect of the present disclosure, a virtual sound generation apparatus may include a first sensor configured to obtain biometric information about a passenger, an output device configured to output a virtual sound, and a processor electrically connected with the first sensor and the output device. The processor may be configured to: determine a driving sensibility for the passenger based on the biometric information obtained by the first sensor, generate an effect signal for guiding the passenger to be stimulated depending on the driving sensibility, and control the output virtual sound based on the effect signal.

In an embodiment, the virtual sound may include at least one of: a virtual engine sound of a vehicle and/or a guidance sound for providing a notification of an operation state of the vehicle or any combination thereof.

In an embodiment, the virtual sound generation apparatus may further include a memory configured to store a plurality of virtual sounds having different registers. The processor may be further configured to synthesize at least one of the plurality of virtual sounds with the effect sound and output a composite sound.

In an embodiment, the virtual sound generation apparatus may further include a second sensor configured to collect information associated with a driving state of a vehicle. The processor may be further configured to select at least one of the plurality of virtual sounds stored in the memory based on the information collected by the second sensor.

In an embodiment, the processor may be further configured to determine a result comprising at least one of: a low-speed driving environment, an acceleration driving environment, and/or a congestion section driving environment based on the information collected by the second sensor, select at least one virtual sound corresponding to the determined result, and generate the effect signal based on the biometric information obtained while the selected virtual sound is output.

In an embodiment, the processor may be further configured to determine a manipulation state of the passenger based on the information collected by the second sensor, select at least one virtual sound corresponding to the determined result, and generate the effect signal based on biometric information obtained while the selected at least one virtual sound is output.

In an embodiment, the first sensor may include at least one of: a non-contact type electroencephalogram (EEG) sensor configured to obtain an EEG reading of the passenger, a heart rate sensor configured to measure a heart rate of the passenger, and/or a body temperature sensor configured to measure a body temperature of the passenger.

In an embodiment, the processor may be further configured to: determine whether the passenger experiences a stimulus based on information collected by means of the first sensor, while the output of the virtual sound is controlled, and re-generate, when it is determined that the passenger does not experience the stimulus, the effect signal and control the output of the virtual sound based on the re-generated effect signal.

In an embodiment, the virtual sound generation apparatus may further include at least one indoor lighting feature. The processor may be further configured to control, while the output of the virtual sound is controlled, the at least one indoor lighting feature using a light emitting pattern corresponding to the driving sensibility.

According to another aspect of the present disclosure, a vehicle system may include a manipulation device including a steering input device, an acceleration input device, and a brake input device and a virtual 1 sound generation apparatus electrically connected with the manipulation device. The virtual sound generation apparatus may be configured to obtain biometric information about a passenger who controls the manipulation device, determine at least one driving sensibility for the passenger based on the biometric information, generate an effect signal for guiding the passenger to be stimulated depending on the driving sensibility, and control an output of a virtual sound based on the effect signal.

In an embodiment, the vehicle system may further include a memory configured to store a plurality of virtual sounds having different registers. The virtual sound generation apparatus may be configured to select at least one virtual sound corresponding to a driving state of a vehicle and generate the effect signal based on biometric information obtained while the virtual sound is output.

In an embodiment, the virtual sound generation apparatus may be configured to: determine a first driving sensibility based on the biometric information, output a first effect signal while the virtual sound is output, and when the first driving sensibility is determined, determine a second driving sensibility based on the biometric information; and output a second effect signal while the virtual sound is output, and when the second driving sensibility is determined.

According to another aspect of the present disclosure, an operation method of a virtual sound generation apparatus may include obtaining biometric information about a passenger from a first sensor configured to collect the biometric information, determining a driving sensibility for the passenger based on the obtained biometric information, generating an effect signal for guiding the passenger to be stimulated depending on the driving sensibility, and controlling an output of a virtual sound based on the effect signal.

In an embodiment, the virtual sound may include at least one of: a virtual engine sound of a vehicle and/or a guidance sound, the virtual sound providing a notification of an operation state of the vehicle In an embodiment, the operation method may further include synthesizing at least one of a plurality of virtual sounds having different registers with the effect signal, the plurality of virtual sounds being stored in a memory of the virtual sound generation apparatus, and outputting a composite sound.

In an embodiment, the operation method may further include selecting at least one of the plurality of virtual sounds stored in the virtual sound generation apparatus, based on information collected by a second sensor configured to collect the information associated with a driving state of a vehicle.

In an embodiment, the operation method may further include determining, based on the information collected by the second sensor, at least one of a low-speed driving environment, an acceleration driving environment, and/or a congestion section driving environment, selecting at least one virtual sound corresponding to the determined result, and generating, based on the information collected by the second sensor, the effect signal based on biometric information obtained while the selected virtual sound is output.

In an embodiment, the operation method may further include determining, based on the information collected by the second sensor, a manipulation state of the passenger for the vehicle, selecting at least one virtual sound corresponding to the determined result, and generating, based on the biometric information obtained while the selected virtual sound is output, the effect signal.

In an embodiment, the operation method may further include determining, based on the information collected by the first sensor and while the output of the virtual sound is being controlled, whether the passenger experiences a stimulus, and re-generating the effect signal when it is determined that the passenger does not experience the stimulus; and controlling the output of the virtual sound based on the re-generated effect signal.

In an embodiment, the operation method may further include controlling, while the output of the virtual sound is being controlled, at least one indoor lighting in a vehicle using a light emitting pattern corresponding to the driving sensibility.

BRIEF DESCRIPTION OF THE DRAWINGS

The above and other objects, features and advantages of the present disclosure will be more apparent from the following detailed description taken in conjunction with the accompanying drawings.

Figure 1:
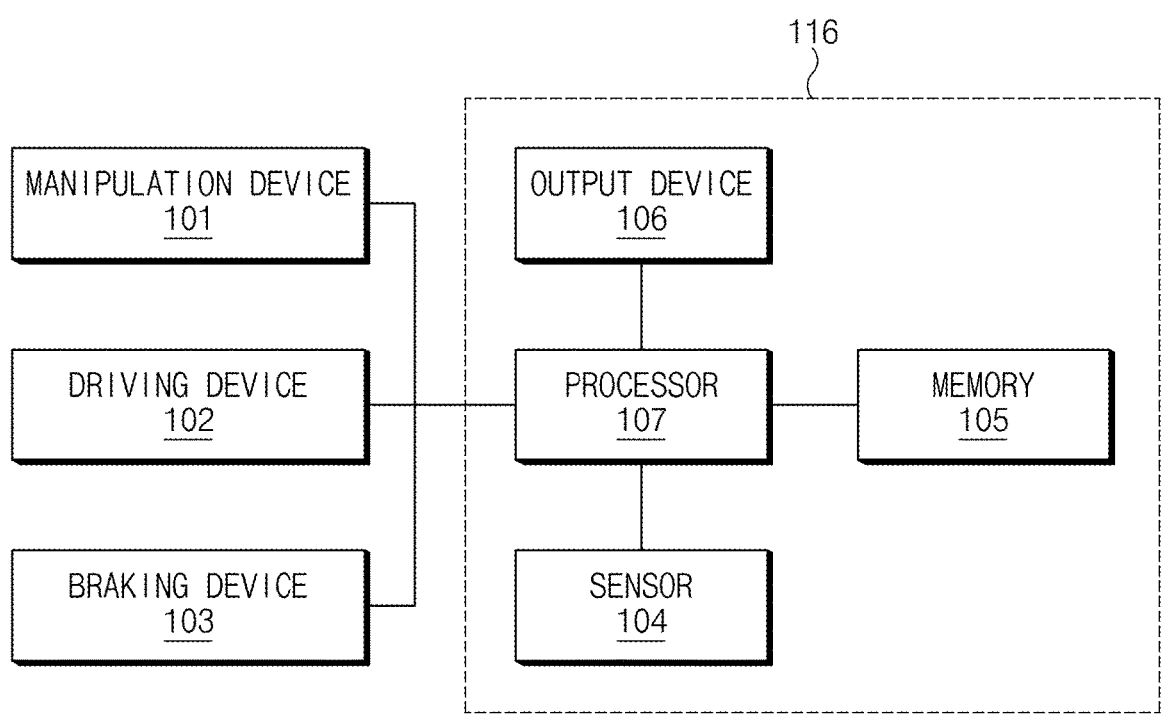
FIG. 1 is a block diagram illustrating a configuration of a vehicle system including a virtual sound generation apparatus according to various embodiments of the present disclosure.

With regard to description of drawings, the same or similar notations may be used for the same or similar components.

DETAILED DESCRIPTION

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure described below relates to a virtual sound generation apparatus for providing a virtual sound (e.g., sensibility content and super-realistic sound content) for constructing a sound scape, a system including the same, and a method thereof. For example, the virtual sound generation apparatus, the system including the same, and the method thereof may generate a virtual sound based on an autonomous sensory meridian response of guiding a passenger to be stimulated based on driving information (e.g., driver manipulation information by a speed and a pedal or the like) of a vehicle, a driving environment (e.g., a low-speed driving environment, an acceleration driving environment, a congestion section driving environment, or the like) of the vehicle, and/or biometric information (e.g., EEG, a heart rate, a body temperature, or the like) of the passenger and may provide various sounds based on sensibility modeling of the passenger.

A vehicle described below may refer to an eco-friendly vehicle in which a motor as a power source is provided, which refers to including a vehicle driven by the riding and manipulation of a driver and an autonomous vehicle having a function capable of allowing the vehicle to drive on its own without the intervention of the driver. Furthermore, a car is described as one example of a vehicle in the description below, and the present disclosure is not limited thereto. For example, various embodiments below are applicable to various means of transportation such as a ship, an airplane, a train, a motorcycle, or a bicycle.

Hereinafter, embodiments of the present disclosure will be described in detail with reference to FIGS. 1 to 11.

FIG. 1 is a block diagram illustrating a configuration of a vehicle system including a virtual sound generation apparatus according to various embodiments of the present disclosure. For example, the vehicle system may be interpreted as a vehicle or some components of the vehicle.

Referring to FIG. 1, a vehicle system 100 according to various embodiments may include a manipulation device 101, a driving device 102, a braking device 103, a sensor 104, a memory 105, an output device 106, and a processor 107.

However, this is merely illustrative, and the present disclosure is not limited thereto. For example, at least one of the components of the vehicle system 100, which are described above, may be omitted or one or more other components may be added to the configuration of the vehicle system 100. Furthermore, at least one of the components of the vehicle system 100, which are described above, may be integrated with another component.

According to an embodiment, the manipulation device 101 may receive a user input for driving. According to an embodiment, the manipulation device 101 may include a steering input device (e.g., a steering wheel), an acceleration input device (e.g., an accelerator pedal), and a brake input device (e.g., a brake pedal).

However, this is merely illustrative, and the present disclosure is not limited thereto. For example, devices for manipulating a seat heating wire, an interior light, a radio, a navigation system, a turn signal, a tail lamp, a headlamp, a wiper, an air conditioner and furnace, and the like loaded into the vehicle may be configured as at least a part of the manipulation device 101.

According to various embodiments, the driving device 102 may generate a power source associated with driving of the vehicle. According to an embodiment, the driving device 102 may include an engine and/or a motor.

For example, power generated by the driving device 102 may be transferred to an axle through a transmission and a differential gear device. Thus, as a drive wheel rotates by the axle, the vehicle travels. As the transmission, the differential gear device, the axle, and the drive wheel are well known in many documents, a detailed description thereof will be omitted in the present disclosure.

According to various embodiments, the braking device 103 may perform electronic control of a brake apparatus in the vehicle. According to an embodiment, the braking device 103 may control operations of brakes respectively arranged on a plurality of drive wheels to adjust a speed (e.g., deceleration) of the vehicle.

According to various embodiments, the sensor 104 may sense a state of a passenger and/or a state of the vehicle system 100 and may generate an electrical signal or a data value corresponding to the sensed state.

According to an embodiment, as will be described with reference to FIG. 2A, the sensor 104 may include a first sensor 200 configured to collect biometric information about a passenger. Additionally, as will be described with reference to FIG. 4, the sensor 104 may include a second sensor 400 configured to collect information associated with a driving state of the vehicle system 100.

However, this is merely illustrative, and the present disclosure is not limited thereto. For example, the sensor 104 may further include various sensors, such as a light detection and ranging (LiDAR) sensor, a radar sensor, a camera sensor, and an ultrasonic sensor, which are capable of sensing a surrounding environment (e.g., a surrounding object) around the vehicle system 100.

According to various embodiments, the memory 105 may include data related to at least one other component of the vehicle system 100 and a program, an algorithm, a routine, and/or an instruction associated with an operation (or control) of the vehicle system 100.

For example, the memory 105 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk, or any combination thereof.

According to various embodiments, the output device 106 may output information associated with an operation of the vehicle system 100. According to an embodiment, the output device 106 may include a sound output device (e.g., a speaker) configured to output audible information. Additionally, the output device 106 may include a display (e.g., a head-up display, a touch screen, a cluster, or the like) configured to output visual information, a haptic module (e.g., a motor, a piezoelectric element, an electrical stimulation device, or the like) configured to output tactile information, or the like.

According to various embodiments, the processor 107 may be electrically connected with the manipulation device 101, the driving device 102, the braking device 103, the sensor 104, the memory 105, and the output device 106 and may control the overall operation of the vehicle system 100. According to an embodiment, the processor 107 may be an electronic control unit (ECU), a micro controller unit (MCU), or another sub-controller, which is loaded into the vehicle.

The vehicle system 100 according to an embodiment may include a virtual sound generation apparatus 116 configured to generate a virtual sound based on driving sensibility of a passenger (e.g., a driver) and a driving state of the vehicle. Such a virtual sound generation apparatus 116 may be implemented in the vehicle. In this case, the virtual sound generation apparatus 116 may be integrally configured with control units in the vehicle or may be implemented as a separate device to be connected with the control units of the vehicle by a separate connection means.

For example, the virtual sound generation apparatus 116 may be composed of the sensor 104, the memory 105, the output device 106, and the processor 107. This is merely illustrative, and another component of the vehicle system 100 may be added to the configuration of the virtual sound generation apparatus 116.

A description will be given of the virtual sound generation apparatus 116 according to various embodiments with reference to FIGS. 2A to 6.

FIGS. 2A to 2E are drawings illustrating a configuration of a virtual sound generation apparatus according to various embodiments.

Figure 2A:
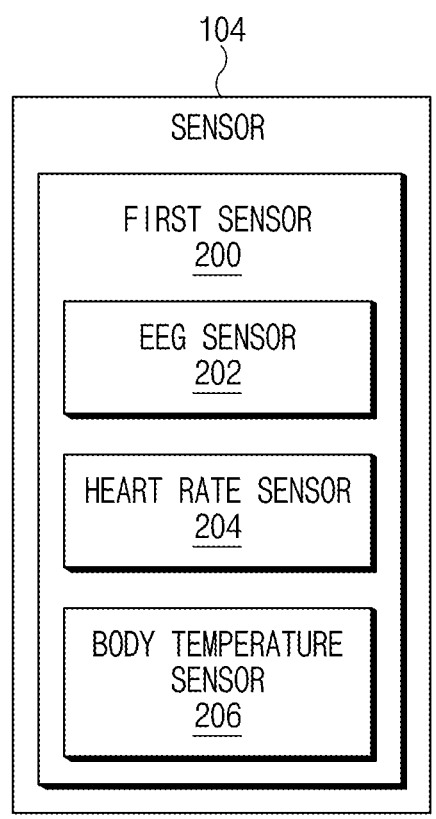
FIGS. 2A, 2B, 2C, 2D, and 2E are drawings illustrating a configuration of a virtual sound generation apparatus according to various embodiments.

Referring to FIG. 2A, a virtual sound generation apparatus 116 of FIG. 1 may include a first sensor 200 configured to collect biometric information about a passenger. The first sensor 200 may include at least one of an electroencephalogram (EEG) sensor 202, a heart rate sensor 204, or a body temperature sensor 206, or any combination thereof. However, this is merely illustrative, and the present disclosure is not limited thereto. A sensor configured to collect various types of pieces of biometric information may be additionally provided.

According to an embodiment, the EEG sensor 202 may obtain an EEG signal from the biometric information collected from the passenger. The EEG signal may be an important index for measuring brain activity, which may be differently measured according to a mental and physical state of the passenger.

In general, the EEG sensor 202 may obtain an EEG signal in a state it is in contact with a body (e.g., a head) of the passenger. However, because gel or saline should be applied to the body of the passenger when measuring EEG and because the material of the EEG sensor 202 which is in contact with the body of the passenger is a metal material, the passenger may feel uncomfortable wearing the EEG sensor 202 and the EEG sensor 202 which is in contact with the body of the passenger may act as an element of interfering with driving of the passenger. Thus, the present disclosure may use the non-contact type EEG sensor 202 configured to obtain an EEG signal in a state where it is disposed spaced apart from the body of the passenger.

Figure 2B:
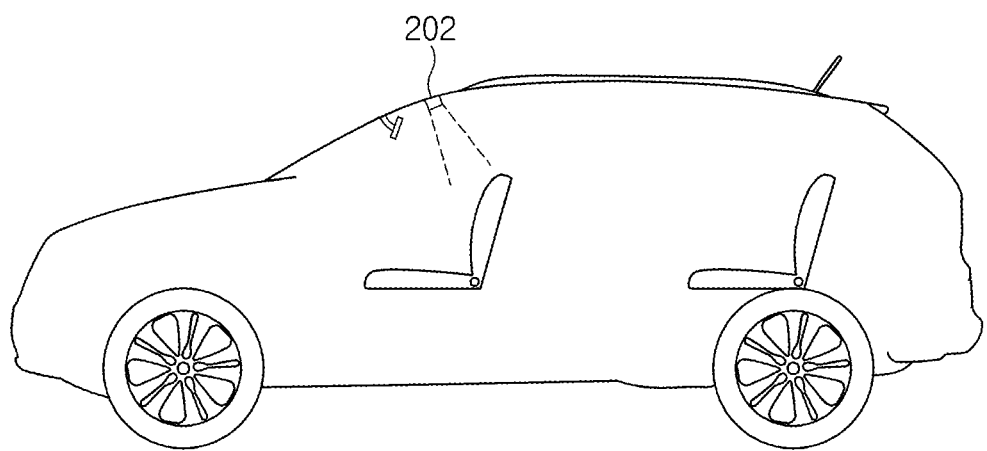

For example, as shown in FIG. 2B, the EEG sensor 202 may be provided in the interior of the vehicle, which is spaced apart from a passenger at a certain distance, and may be configured to transmit an electromagnetic wave to at least a part of the body of the passenger and receive a signal reflected and returned from the at least a part of the body. For example, fine motion and EEG for a part (e.g., a neck, eyes, a head, or the like) of the body, which are caused from fine vibration of the vestibular system affecting the autonomic nervous system, respiration, and the cardiovascular system, may have a correlation therebetween. Thus, the EEG sensor 202 may sense fine motion for the body from the signal reflected from a part of the body and may obtain an EEG signal based on the sensed fine motion.

According to an embodiment, the heart rate sensor 204 may obtain a heart rate from the biometric information collected from the passenger. The heart rate sensor 204 may include a light emitting part and a light receiving part, which may sense light returned to the light receiving part after light emitted by the light emitting part is reflected from a part of the body and may convert the sensed light into an electrical signal, thus measuring a heart rate.

According to an embodiment, the body temperature sensor 206 may measure a body temperature of the passenger from the biometric information collected from the passenger. The body temperature sensor 206 may measure a temperature delivered from the body.

Figure 2C:
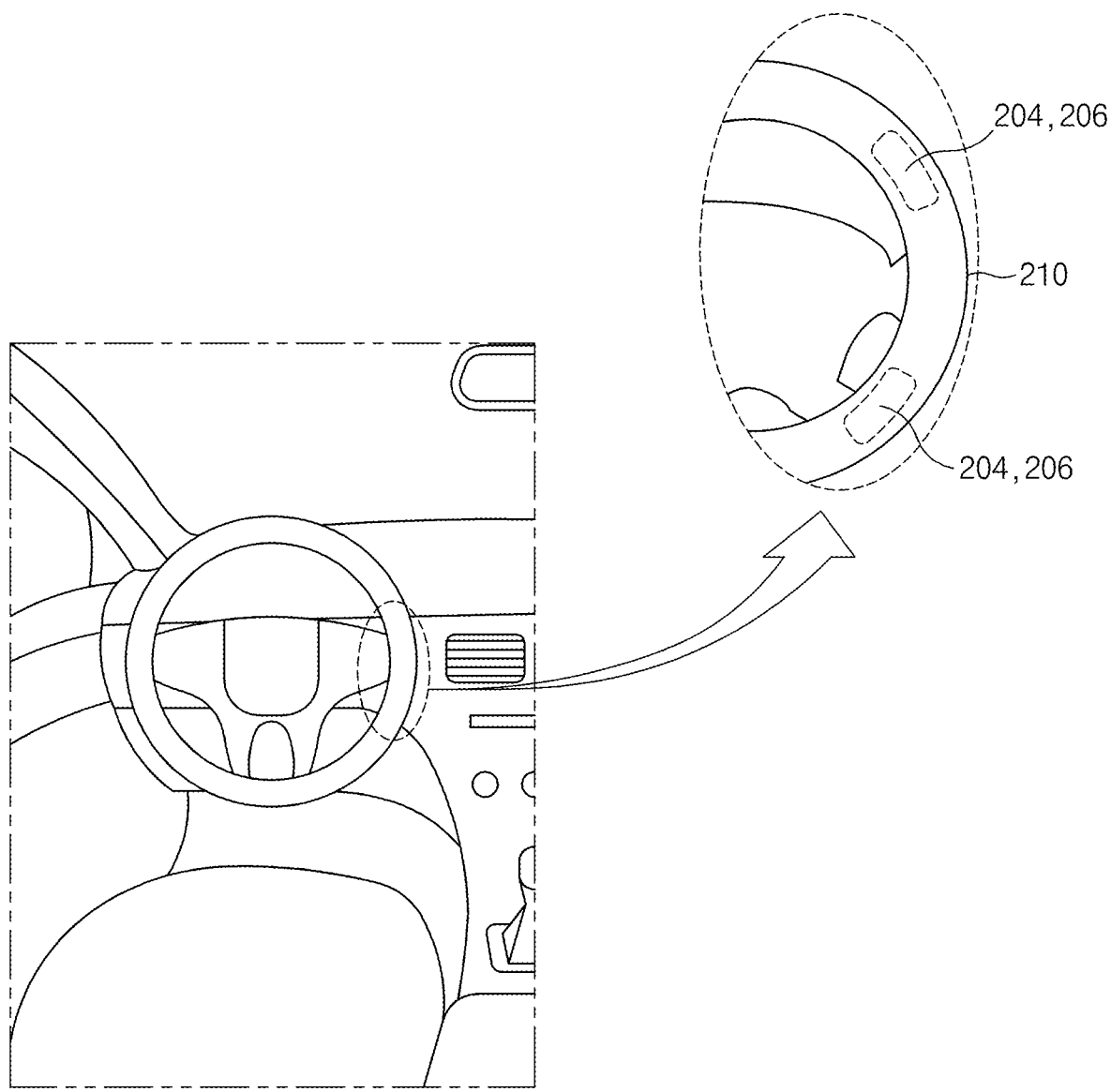

The heart rate sensor 204 and the body temperature sensor 206 may be arranged to be in direct contact with the body to derive an accurate measurement result. For example, as shown in FIG. 2C, the heart rate sensor 204 and/or the body temperature sensor 206 may be provided in a steering wheel 210. When the passenger holds the steering wheel 210, the heart rate sensor 204 and/or the body temperature sensor 206 may be in contact with a palm of the passenger.

Figure 2D:
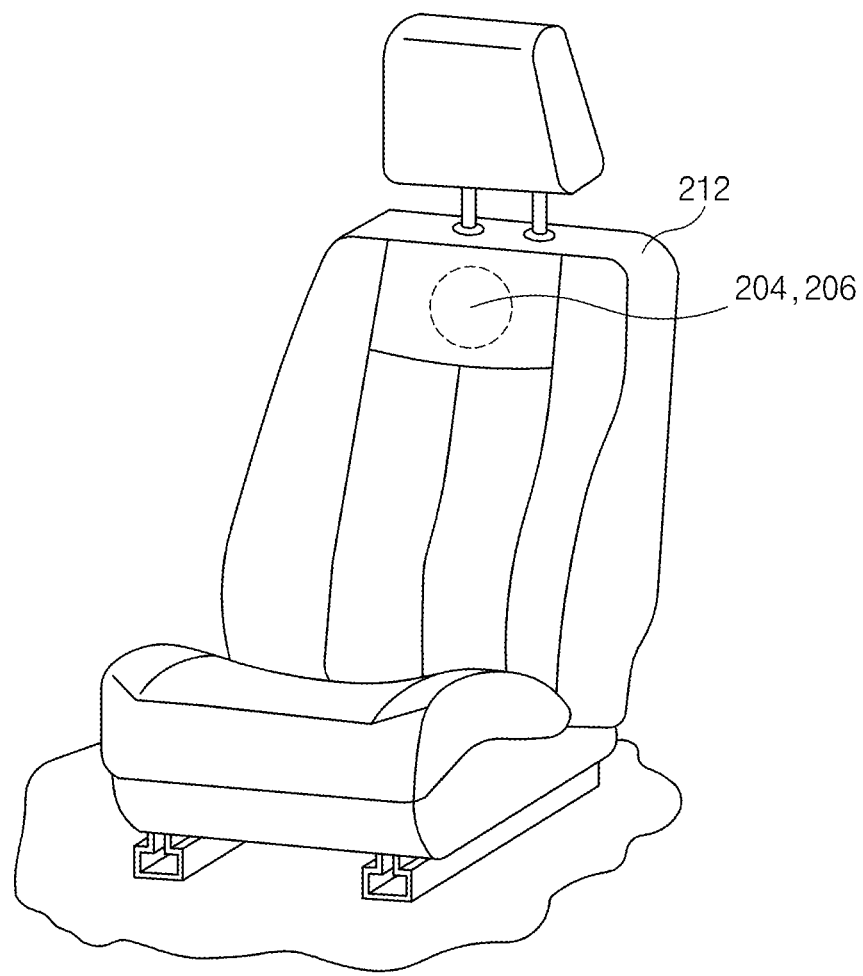

However, this is merely illustrative, and the present disclosure is not limited thereto. For example, as shown in FIG. 2D, the heart rate sensor 204 and/or the body temperature sensor 206 may be provided in a seat assembly 212 in the vehicle or may be arranged in various places which are easy to come into contact with a body (e.g., a palm, a finger, and the like) of the passenger and may be configured to support a non-contact scheme.

Figure 2E:
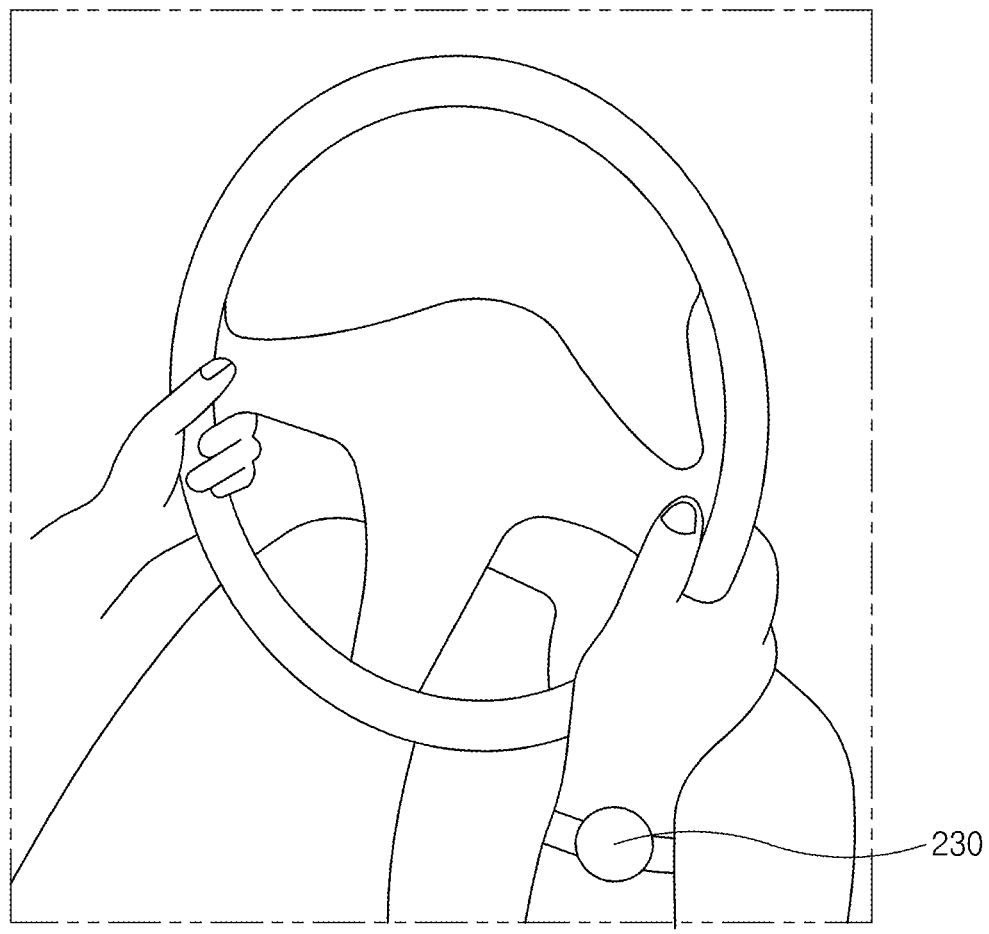

Furthermore, the heart rate sensor 204 and/or the body temperature sensor 206 may be provided as component(s) separated from a vehicle system 100 of FIG. 1. For example, as shown in FIG. 2E, the vehicle system 100 may obtain hear rate information and body temperature information, measured by an external device 230 (e.g., a wearable device) worn on the body of the passenger, through communication.

In this regard, a description will be given of an operation of the virtual sound generation apparatus 116 with reference to FIG. 3.

Figure 3:
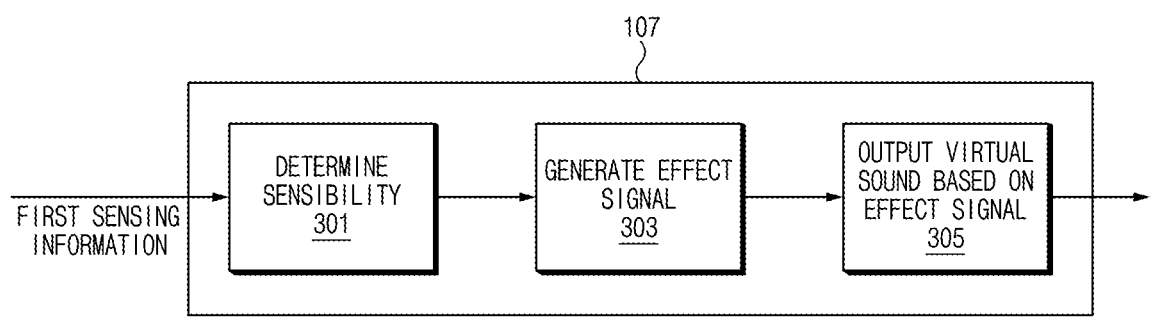
FIG. 3 is a drawing illustrating an operation algorithm of a virtual sound generation apparatus according to various embodiments.
Figure 6:
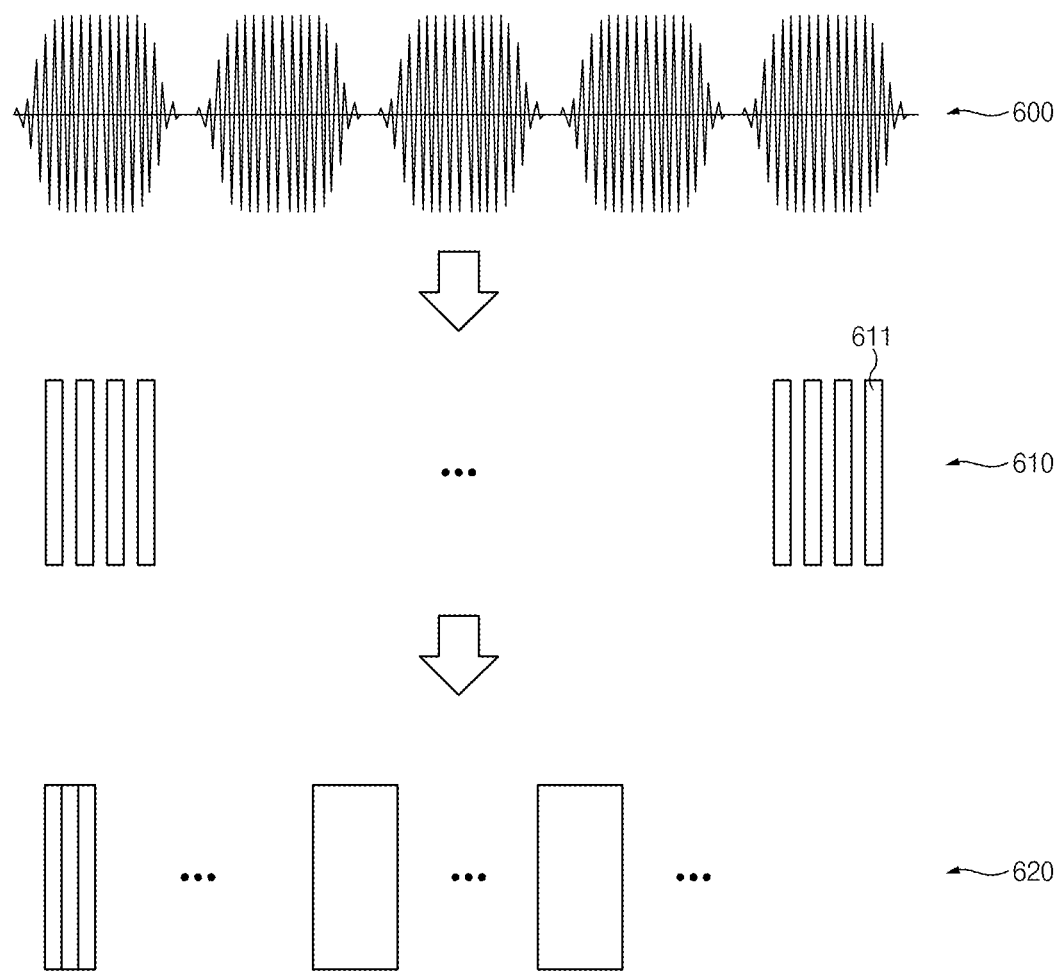
FIG. 6 is a drawing illustrating an operation of synthesizing a virtual sound with an effect signal according to various embodiments.

FIG. 3 is a drawing illustrating an operation algorithm of a virtual sound generation apparatus according to various embodiments. FIG. 6 is a drawing illustrating an operation of synthesizing a virtual sound with an effect signal according to various embodiments.

Referring to FIG. 3, a processor 107 of FIG. 1 according to various embodiments may determine driving sensibility for a passenger based on first sensing information collected by means of a first sensor 200 of FIG. 2A (refer to reference numeral 301).

The driving sensibility may be a stimulus (or a sense of psychological stability or pleasure) a passenger wants to obtain by means of vehicle driving. For example, the driving sensibility may include first driving sensibility (hereinafter, referred to as "relax sensibility") allowing the passenger to feel stimulated by means of safety driving, second driving sensibility (hereinafter, referred to as "high-performance vehicle sensibility") allowing the passenger to feel stimulated by means of high performance, and third driving sensibility (hereinafter, referred to as "meditation sensibility") allowing the passenger to feel stimulated by means of stress relief.

Such driving sensibility may be determined by an emotion of the passenger, which is obtained by means of biometric information. The processor 107 may generate an effect signal based on the driving sensibility (refer to reference numeral 303). The effect signal may be information about a sound guiding the passenger to be stimulated.

For example, the processor 107 may determine an emotion of the passenger based on the result of comparing the measured heart rate, EEG, and body temperature with a predefined emotion recognition model. For example, whether the passenger has a happy emotion, a pleasant emotion, a strong emotion, or the like may be determined by the result of the comparison with the emotion recognition model.

According to an embodiment, there may be a high possibility that the passenger in a happy emotion state will drive with the relax sensibility when the passenger drives. Thus, the processor 107 may generate the effect signal for outputting a sound which provides a comfortable and stable atmosphere such that safety driving of the passenger is maintained.

According to an embodiment, there may be a high possibility that the passenger in the happy emotion state will drive with the high-performance vehicle sensibility when the passenger drives. Thus, the processor 107 may generate the effect signal for outputting a sound having a strong beat such that the processor may experience high performance.

According to an embodiment, there may be a high probability of occurrence of a safety accident when the passenger in a strong emotion state drives. Thus, the processor 107 may generate the effect signal for outputting a sound which provides psychological stability to reduce stress of the passenger such that driving of meditation sensibility is performed.

The above-mentioned condition of determining the driving sensibility and the method for generating the effect signal according to the condition are according to an embodiment of the present disclosure. The driving sensibility may be determined or the effect signal may be generated in various methods other than the above-mentioned methods. For example, information associated with a driving state (or vehicle control), which is collected by means of a second sensor 400 described below with reference to FIG. 4 may be used to determine driving sensibility.

For example, the processor 107 may determine driving sensibility for a passenger based on an accelerator pedal opening amount (or an accelerator pedal manipulation pattern), a gear shift state (or a gear shift pattern), or the like. As an example, a manipulation pattern for manipulating an accelerator pedal below a certain number of times during a certain time may be associated with the first driving sensibility and/or the second driving sensibility, and a manipulation pattern for manipulating the accelerator pedal over the certain number of times during the certain time may be associated with the third driving sensibility.

Furthermore, the processor 170 may determine driving sensibility for the passenger based on a speed of the vehicle, revolutions per minute (RPM) of the engine of the vehicle, or the like. As an example, a vehicle speed of less than a certain level may be associated with the first driving sensibility and/or the second driving sensibility, and a vehicle speed of greater than or equal to the certain level may be associated with the third driving sensibility.

According to various embodiments, the processor 107 may output a virtual sound based on the effect signal (refer to reference numeral 305). The virtual sound may include a virtual engine sound. In addition, the virtual sound may include various types of guidance sounds which provide a notification of an operation state of the vehicle (e.g., a guidance sound which provides a notification that the vehicle is started, a guidance sound which provides a notification that the door is opened). For example, the processor 107 may synthesize (or apply) the effect sound with (or to) the virtual sound and may output the synthesized (or applied) sound.

According to an embodiment, as shown in FIG. 6, the processor 107 may decompose a predefined virtual sound 600 in a certain unit 611 (e.g., for each grain) (refer to reference numeral 610) and may perform processing, for example, pitch control, gain control, grain level control, or frequency filtering, of each decomposed virtual sound based on the effect signal (refer to reference numeral 620).

For example, when an effect signal for outputting a sound which provides a comfortable and stable atmosphere is generated such that safety driving of the passenger is maintained, the passenger 107 may process a predefined virtual sound (e.g., a predefined driving sound) such that the predefined virtual sound (or the predefined driving sound) provides the comfortable and stable atmosphere.

For another example, when an effect signal for outputting a sound having a strong beat is generated to experience high performance, the passenger 107 may process the predefined virtual sound (e.g., the predefined driving sound) such that the passenger feels the thrust of a vehicle by the predefined virtual sound (or the predefined driving sound).

For another example, when an effect signal for outputting a sound which provides a sense of psychological stability is generated, the processor 107 may process the predefined virtual sound such that the predefined virtual sound provides the sense of psychological stability.

In this regard, as a result of analyzing a relationship between a frequency and a sound pressure level (SPL) of the virtual sound to which the effect signal is applied, the virtual sound generation apparatus may output a virtual sound having a lower register which provides the comfortable and stable atmosphere, a virtual sound having an upper register which provides high performance experience, and a virtual sound having a middle register which provides the sense of psychological stability.

Figure 4:
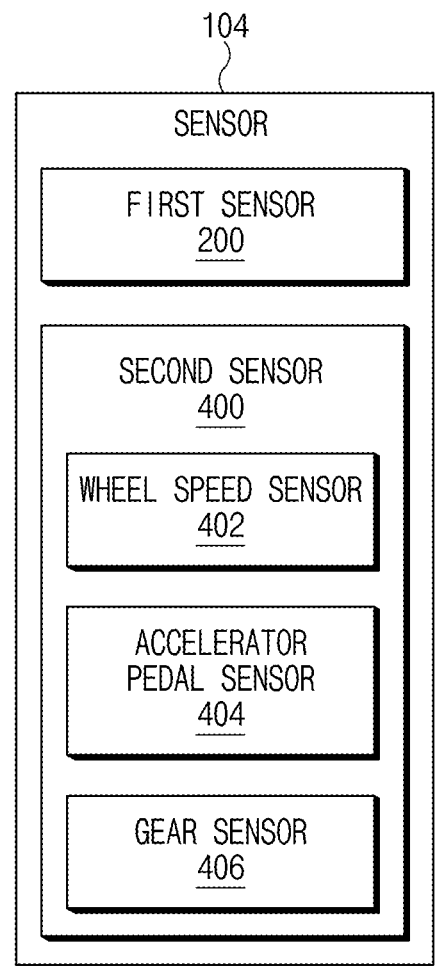
FIG. 4 is a block diagram illustrating another configuration of a virtual sound generation apparatus according to various embodiments.
Figure 5:
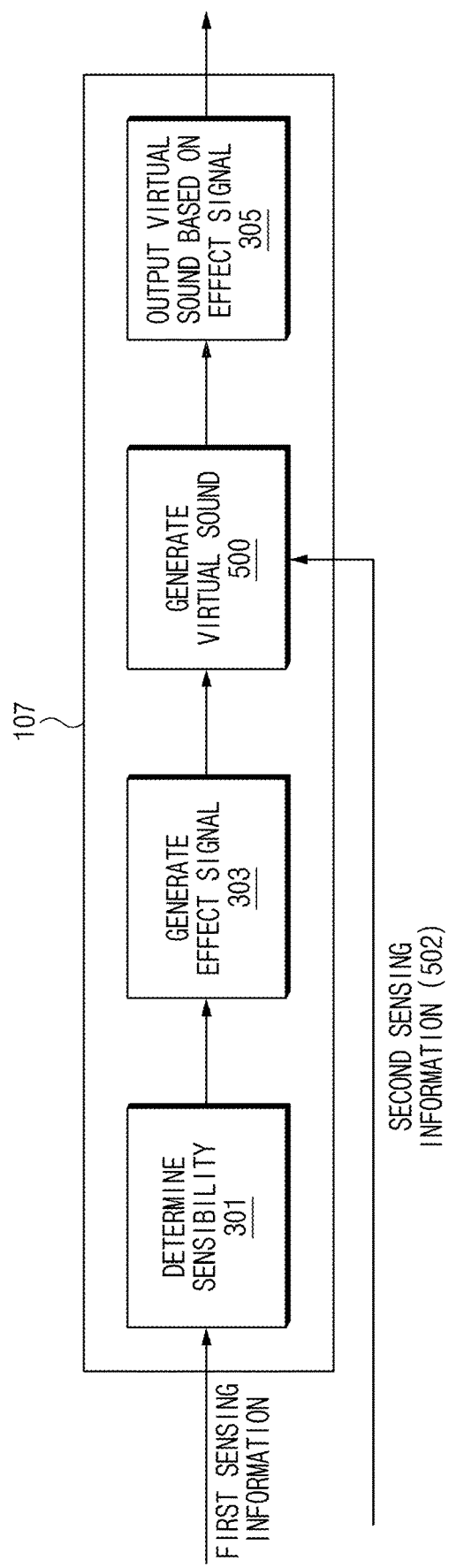
FIG. 5 is a drawing illustrating another operation algorithm of a virtual sound generation apparatus according to various embodiments.

FIG. 4 is a block diagram illustrating another configuration of a virtual sound generation apparatus according to various embodiments. FIG. 5 is a drawing illustrating another operation algorithm of a virtual sound generation apparatus according to various embodiments.

Referring to FIG. 4, a virtual sound generation apparatus 116 of FIG. 1 according to various embodiments may differentiate a virtual sound synthesized with an effect signal depending on a driving state (or a driving environment) of a vehicle. For example, the virtual sound generation apparatus 116 may provide a virtual sound differentiated according to a low-speed driving state, a constant-speed driving state, an acceleration driving state, or a congestion section driving state of the vehicle.

According to various embodiments, the virtual sound generation apparatus 116 may include a second sensor 400 configured to collect information associated with a driving state of the vehicle. The second sensor 400 may include at least one of a wheel speed sensor 402, an accelerator pedal sensor 404, or a gear sensor 406, or any combination thereof. However, this is merely illustrative, and the present disclosure is not limited thereto. For example, the information associated with the driving state of the vehicle may include lateral acceleration, longitudinal acceleration, or a yaw rate. In this regard, a lateral acceleration sensor, a longitudinal acceleration sensor, and a yaw rate sensor may be provided as components of the virtual sound generation apparatus 116.

According to an embodiment, the wheel speed sensor 402 may be mounted on a drive wheel and may be configured to measure RPM (or a wheel speed) of the drive wheel. The wheel speed sensor 402 is schematically shown as one in the drawing, but not limited thereto. The wheel speed sensor 402 may be mounted for each drive wheel to measure a rotational speed of each drive wheel.

According to an embodiment, the accelerator pedal sensor 404 may be configured to measure a position of an accelerator pedal operated by the driver. For example, the accelerator pedal sensor 404 may output a quantitative measurement value corresponding to a displacement of the accelerator pedal.

According to an embodiment, the gear sensor 406 may measure a gear shift state. For example, the gear sensor 406 may measure a rotational speed of a drive gear.

In this regard, a description will be given of an operation of the virtual sound generation apparatus 116 with reference to FIG. 5.

Referring to FIG. 5, as described above with reference to FIG. 3, a processor 107 of FIG. 1 according to various embodiments may determine driving sensibility for a passenger based on first sensing information (refer to reference numeral 301) and may generate an effect signal based on the driving sensibility (refer to reference numeral 303). According to an embodiment, the processor 107 may generate different effect signals depending on the driving sensibility for the passenger. The effect signal may include an after-burn sound. For example, the processor 107 may generate an after-burn sound to which a first effect is applied as the effect signal, based on driving sensibility for allowing the passenger to feel stimulated by means of high performance. Furthermore, the processor 107 may generate an after-burn sound to which a second effect different from the first effect is applied as the effect signal, based on driving sensibility for allowing the passenger to feel stimulated by means of safety driving.

In addition, according to various embodiments, the processor 107 may generate a virtual sound based on second sensing information collected by means of the second sensor 400 (refer to reference numeral 500).

According to an embodiment, similar to that described with reference to FIG. 6, the processor 107 may decompose a predefined virtual sound 600 in a certain unit 611 (e.g., for each grain) (refer to reference numeral 610) and may perform processing, for example, pitch control, gain control, grain level control, or frequency filtering, of each decomposed virtual sound based on at least one of a speed of the vehicle, RPM of the engine of the vehicle, an accelerator pedal opening amount of the vehicle, or a gear shift state of the vehicle (refer to reference numeral 620), or any combination thereof, thus generating a virtual sound.

For example, when the driving state of the vehicle corresponds to a first state (e.g., a low-speed driving state of less than 30 km/h), the processor 107 may generate a first virtual sound corresponding to the vehicle in the low-speed driving state. For example, the first virtual sound may be a virtual engine sound having a first register (e.g., a lower register) which provides a grand feeling.

For another example, when the driving state of the vehicle corresponds to a second state (e.g., a high-speed driving state of greater than or equal to 100 km/h), the processor 107 may generate a second virtual sound corresponding to the vehicle in the high-speed driving state. For example, the second virtual sound may be a virtual engine sound having a second register (e.g., an upper register) which provides an intense feeling.

For another example, when the driving state of the vehicle corresponds to a third state (e.g., a constant-speed driving state of greater than or equal to 30 km/h and less than 100 km/h), the processor 107 may generate a third virtual sound corresponding to the vehicle in the constant-speed driving state. For example, the third virtual sound may be a virtual engine sound having a third register (e.g., a middle register) which provides a light feeling.

For another example, when the driving state of the vehicle corresponds to a fourth state (e.g., an acceleration driving state), the processor 107 may generate a fourth virtual sound corresponding to the vehicle in the acceleration driving state. For another example, the fourth virtual sound may be a virtual engine sound which provides a sense of natural acceleration depending on RPM of the engine of the vehicle. At this time, the processor 107 generate may the fourth virtual sound differentiated according to the RPM of the engine of the vehicle. For example, the processor 107 may differentiate the fourth virtual sound at low RPM of less than or equal to first RPM (e.g., 2500 RPM) from the fourth virtual sound at high RPM of greater than second RPM (e.g., 4500 RPM).

For another example, when the driving state of the vehicle corresponds to a five state (e.g., a state where low-speed driving and stopping are repeated according to traffic congestion), the processor 107 may generate a five virtual sound corresponding to the five state. For example, the five virtual sound may be a virtual engine sound where the output of the first virtual sound and a silent output are alternately output.

However, this is merely illustrative, and the present disclosure is not limited thereto. For example, various types of virtual sounds corresponding to driving states of the vehicle may be stored in the virtual sound generation apparatus 116. In this regard, the processor 107 may obtain a virtual sound corresponding to a state of the vehicle among the various types of virtual sounds which are previously stored in the virtual sound generation apparatus 116.

According to an embodiment, the processor 107 may output the generated virtual sound and the effect signal.

For example, when the vehicle travels in a low-speed state (e.g., a low-speed driving state of less than 30 km/h), the processor 107 may output a virtual sound which provides a grand feeling. In addition, while the virtual sound corresponding to the low-speed state is output, the processor 107 may output an after-burn sound depending on driving sensibility of the passenger, which is determined based on the first sensing information. At this time, while the virtual sound corresponding to the low-speed state is output, the processor 107 may output an after-burn sound to which a first effect is applied or an after-burn sound to which a second effect is applied, depending on driving sensibility of the passenger.

For another example, when the vehicle travels in an acceleration state, the processor 107 may output a virtual sound for allowing the passenger to feel a sense of acceleration which provides an intense feeling. In addition, while the virtual sound corresponding to the acceleration state is output, the processor 107 may output an after-burn sound depending on driving sensibility of the passenger, which is determined based on the first sensing information. At this time, while the virtual sound corresponding to the acceleration state is output, the processor 107 may output an after-burn sound to which the first effect is applied or an after-burn sound to which the second effect is applied, depending on driving sensibility of the passenger.

As described above, the processor 107 may synthesize the virtual sound with the effect signal to output the synthesized sound or may output the effect signal rather than the virtual sound.

In this regard, the processor 107 may generate an alternative sound using at least a portion of the effect signal. The alternative sound may be a sound different from the virtual sound.

For example, when the vehicle travels in a constant-speed driving state, the processor 107 may output an alternative sound (e.g., a healing sound) corresponding to the constant-speed driving state together with or rather than the virtual sound. In addition, when the alternative sound corresponding to the constant-speed driving state is output, the processor 107 may output the alternative sound in a first scheme which emphasizes a specific band or a second scheme which emphasizes another band, depending on driving sensibility of the passenger, which is determined based on the first sensing information.

For another example, in a state where the vehicle travels on a congestion section, the processor 107 may output an alternative sound corresponding to the driving on the congestion section (e.g., a guidance sound for providing a notification of an operation state of the vehicle) together with or rather than the virtual sound. In addition, while the alternative sound corresponding to the driving on the congestion section is output, the processor 107 may output the alternative sound using a first voice (e.g., a voice of a general user) or a second voice (e.g., a voice of a celebrity), depending on driving sensibility of the passenger, which is determined based on the first sensing information.

Hereinafter, a description will be given in detail of an operation method of the virtual sound generation apparatus 116 according to the present disclosure with reference to FIGS. 7 to 10.

Figure 7:
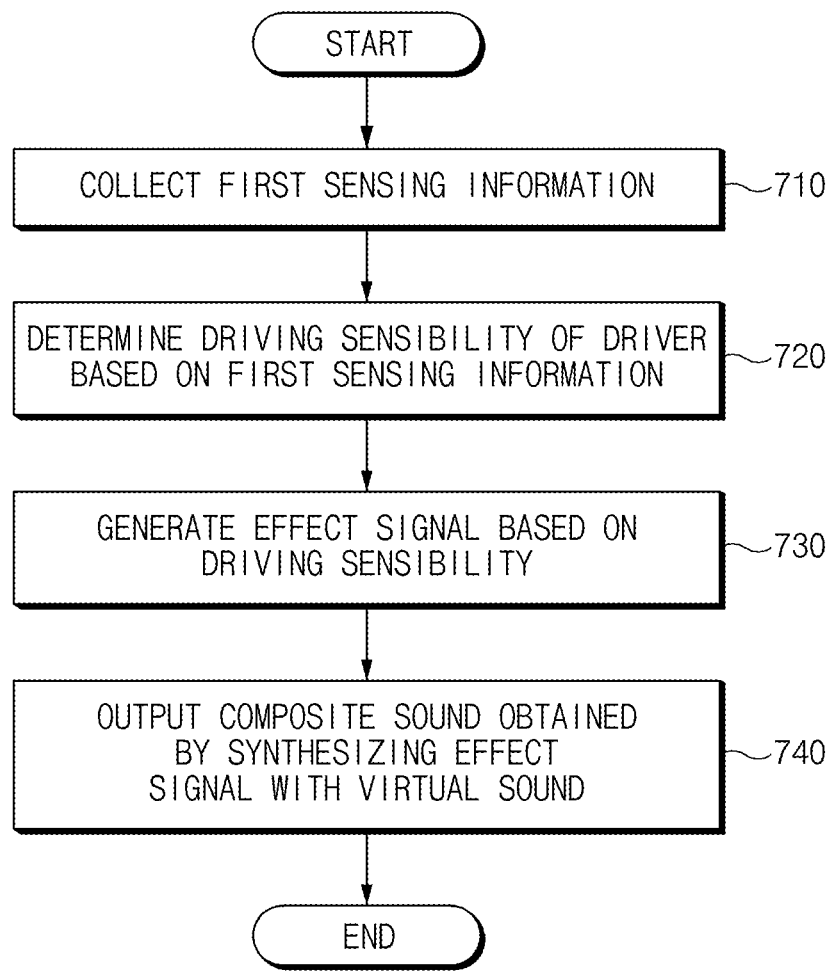
FIG. 7 is a flowchart illustrating an operation of a virtual sound generation apparatus according to the present disclosure.

FIG. 7 is a flowchart illustrating an operation of a virtual sound generation apparatus according to the present disclosure. Respective operations in an embodiment below may be sequentially performed, but are not necessarily sequentially performed. For example, an order of the respective operations may be changed, and at least two operations may be performed in parallel. Furthermore, at least one of operations below may be omitted according to an embodiment.

Referring to FIG. 7, in operation 710, a virtual sound generation apparatus 116 (or a processor 107) of FIG. 1 according to various embodiments may collect first sensing information. The first sensing information may be information collected by means of a first sensor 200 configured to collect biometric information. For example, EEG, a heart rate, a body temperature, and the like of a passenger may be obtained as the first sensing information.

According to various embodiments, in operation 720, the virtual sound generation apparatus 116 (or the processor 107) may determine driving sensibility for a passenger (e.g., a driver) based on the first sensing information. The driving sensibility may be a stimulus (or a sense of psychological stability or pleasure) the passenger wants to obtain by means of vehicle driving.

For example, the driving sensibility may include first driving sensibility (hereinafter, referred to as "relax sensibility") allowing the passenger to feel stimulated by means of safety driving, second driving sensibility (hereinafter, referred to as "high-performance vehicle sensibility") allowing the passenger to feel stimulated by means of high performance, and third driving sensibility (hereinafter, referred to as "meditation sensibility") allowing the passenger to feel stimulated by means of stress relief. According to an embodiment, the driving sensibility may be determined by an emotion of the passenger, which is determined by means of biometric information.

According to various embodiments, in operation 730, the driving force control apparatus 116 (or the processor 107) may generate an effect signal based on the driving sensibility. The effect signal may be information about a sound for guiding the passenger to be stimulated.

For example, when the driving sensibility of the passenger is determined as the relax sensibility, the virtual sound generation apparatus 116 may generate an effect signal to output a sound which provides a comfortable and stable atmosphere.

For another example, when the driving sensibility of the passenger is determined as the high-performance vehicle sensibility, the virtual sound generation apparatus 116 may generate an effect signal to output a sound having a strong beat to experience high performance.

For another example, when the driving sensibility of the passenger is determined as the meditation sensibility, the virtual sound generation apparatus 116 may generate an effect signal to output a sound which provides a sense of psychological stability to reduce stress of the passenger.

According to various embodiments, in operation 740, the virtual sound generation apparatus 116 (or the processor 107) may output a composite sound obtained by synthesizing the effect signal with the virtual sound. The virtual sound may include a virtual engine sound and/or various types of guidance sounds which provide a notification of an operation state of the vehicle (e.g., a guidance sound which provides a notification that the vehicle is started, a guidance sound which provides a notification that the door is opened).

Figure 8:
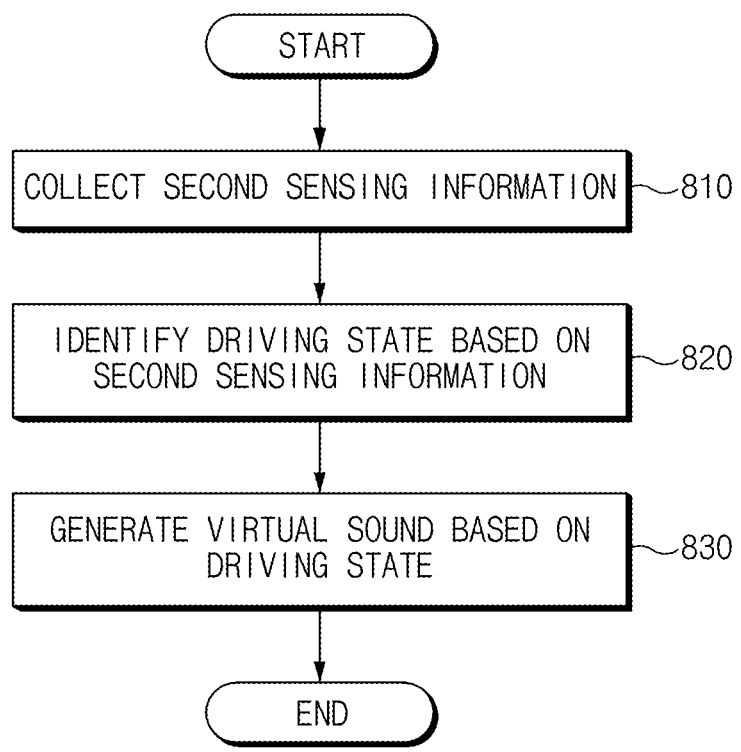
FIG. 8 is a flowchart illustrating an operation of outputting a composite sound in a virtual sound generation apparatus according to various embodiments.

FIG. 8 is a flowchart illustrating an operation of outputting a composite sound in a virtual sound generation apparatus according to various embodiments.

Operations of FIG. 8 described below may indicate various embodiments for operation 740 of FIG. 7. Respective operations in an embodiment below may be sequentially performed, but are not necessarily sequentially performed. For example, an order of the respective operations may be changed, and at least two operations may be performed in parallel. Furthermore, at least one of operations below may be omitted according to an embodiment.

Referring to FIG. 8, in operation 810, a virtual sound generation apparatus 116 (or a processor 107) of FIG. 1 according to various embodiments may collect second sensing information. The second sensing information may be information collected by means of a second sensor 400 configured to collect information associated with a driving state. For example, at least one of a speed of a vehicle, RPM of the engine of the vehicle, an accelerator pedal opening amount of the vehicle, or a gear shift state of the vehicle, or any combination thereof may be collected as the second sensing information.

According to various embodiments, in operation 820, the virtual sound generation apparatus 116 (or the processor 107) may determine a driving state of the vehicle based on the second sensing information. The driving state may include a first state where the vehicle travels at a low speed of less than a specified speed, a second state where the vehicle accelerates, and a third state where the vehicle repeats driving at a low speed and stopping.

According to various embodiments, in operation 830, the virtual sound generation apparatus 116 (or the processor 107) may generate a virtual sound based on the driving state. For example, the virtual sound generation apparatus 116 may generate a virtual sound by decomposing a predefined virtual sound in a certain unit (e.g., for each grain) and performing processing, such as pitch control, gain control, grain level control, or frequency filtering, of each decomposed virtual sound based on at least one of the speed of the vehicle, the RPM of the engine of the vehicle, the accelerator pedal opening amount of the vehicle, or the gear shift state of the vehicle, or any combination thereof. For another example, the virtual sound generation apparatus 116 may obtain a virtual sound corresponding to a state of the vehicle among the various types of virtual sounds which are previously stored. For example, the virtual sound generation apparatus 116 may obtain a first virtual sound capable of providing a comfortable and stable feeling when the driving state of the vehicle is determined as the first state, may obtain a virtual sound capable of providing a sense of natural acceleration when the driving state of the vehicle is determined as the second state, and may obtain a virtual sound capable of providing a sense of psychological stability when the driving state of the vehicle is determined as the third state.

Figure 9:
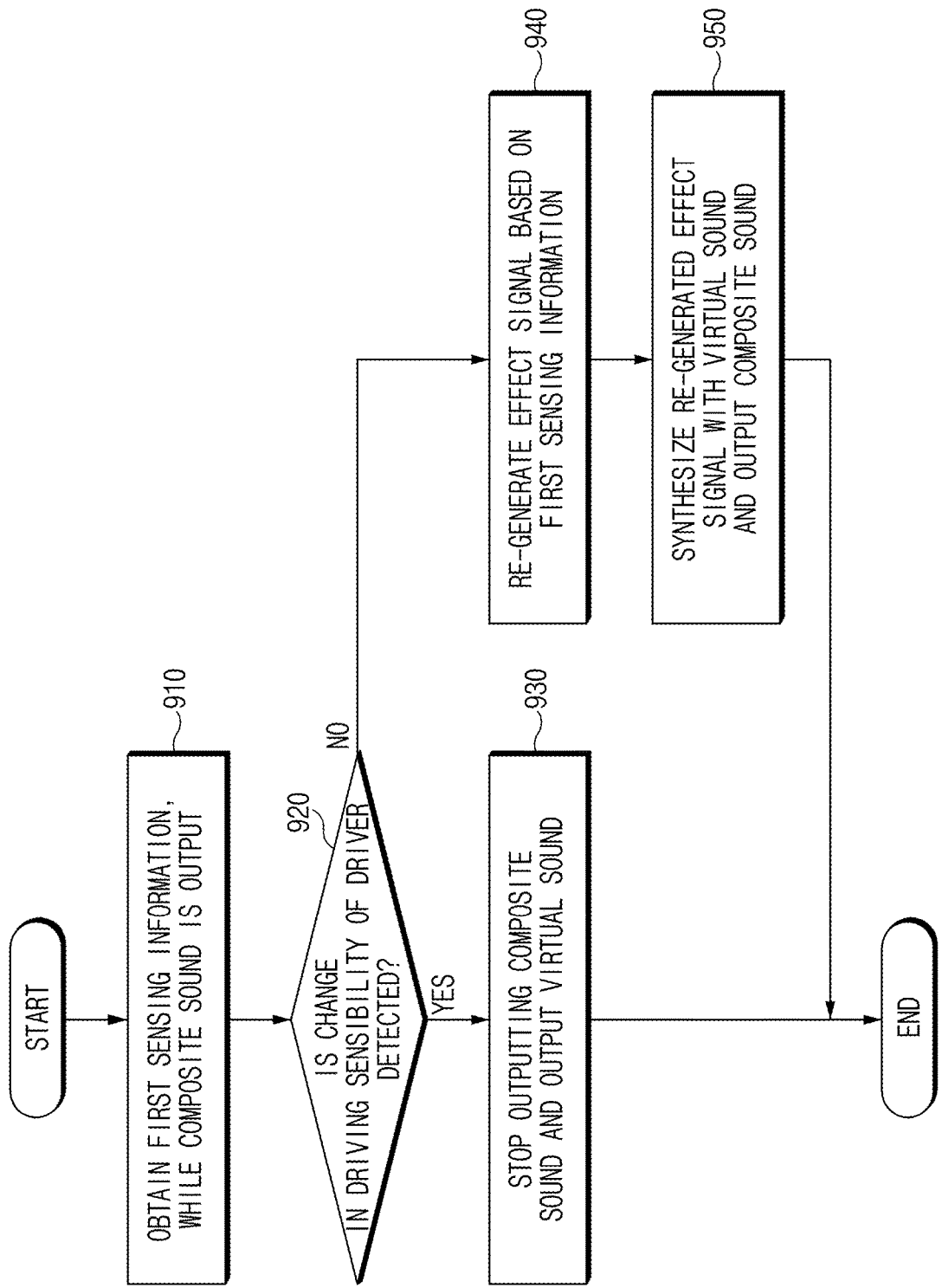
FIG. 9 is a flowchart illustrating another operation of outputting a composite sound in a virtual sound generation apparatus according to various embodiments.

FIG. 9 is a flowchart illustrating another operation of outputting a composite sound in a virtual sound generation apparatus according to various embodiments. Operations of FIG. 9 described below may indicate various embodiments for operation 740 of FIG. 7. Respective operations in an embodiment below may be sequentially performed, but are not necessarily sequentially performed. For example, an order of the respective operations may be changed, and at least two operations may be performed in parallel. Furthermore, at least one of operations below may be omitted according to an embodiment.

Referring to FIG. 9, in operation 910, a virtual sound generation apparatus 116 (or a processor 107) of FIG. 1 according to various embodiments may obtain first sensing information, while a composite sound is output. As described above, the first sensing information may include biometric information about a passenger.

According to various embodiments, in operation 920, the virtual sound generation apparatus 116 (or the processor 107) may determine whether a change in driving sensibility of a passenger (e.g., a driver) is detected based on the first sensing information. According to an embodiment, the virtual sound generation apparatus 116 may determine whether the passenger experiences a stimulus according to driving sensibility by the output of the composite sound.

According to various embodiments, when the driving sensibility of the passenger is changed (e.g., when it is determined that the passenger experiences the stimulus according to the driving sensibility), in operation 930, the virtual sound generation apparatus 116 (or the passenger 107) may stop outputting the composite sound and may output a virtual sound. In other words, the virtual sound generation apparatus 116 may output a previously specified virtual sound to which the effect signal is not applied.

According to various embodiments, when the driving sensibility of the passenger is not changed (e.g., when it is determined that the passenger does not experience the stimulus according to the driving sensibility), in operations 940 and 950, the virtual sound generation apparatus 116 (or the passenger 107) may re-generate an effect signal based on the first sensing information and may synthesize the re-generated effect signal with the virtual sound to output a composite sound.

According to an embodiment, the virtual sound generation apparatus 116 may determine that the passenger does not experience a stimulus by means of the previously generated composite sound and may re-generate and output a composite sound for meeting the passenger.

Figure 10:
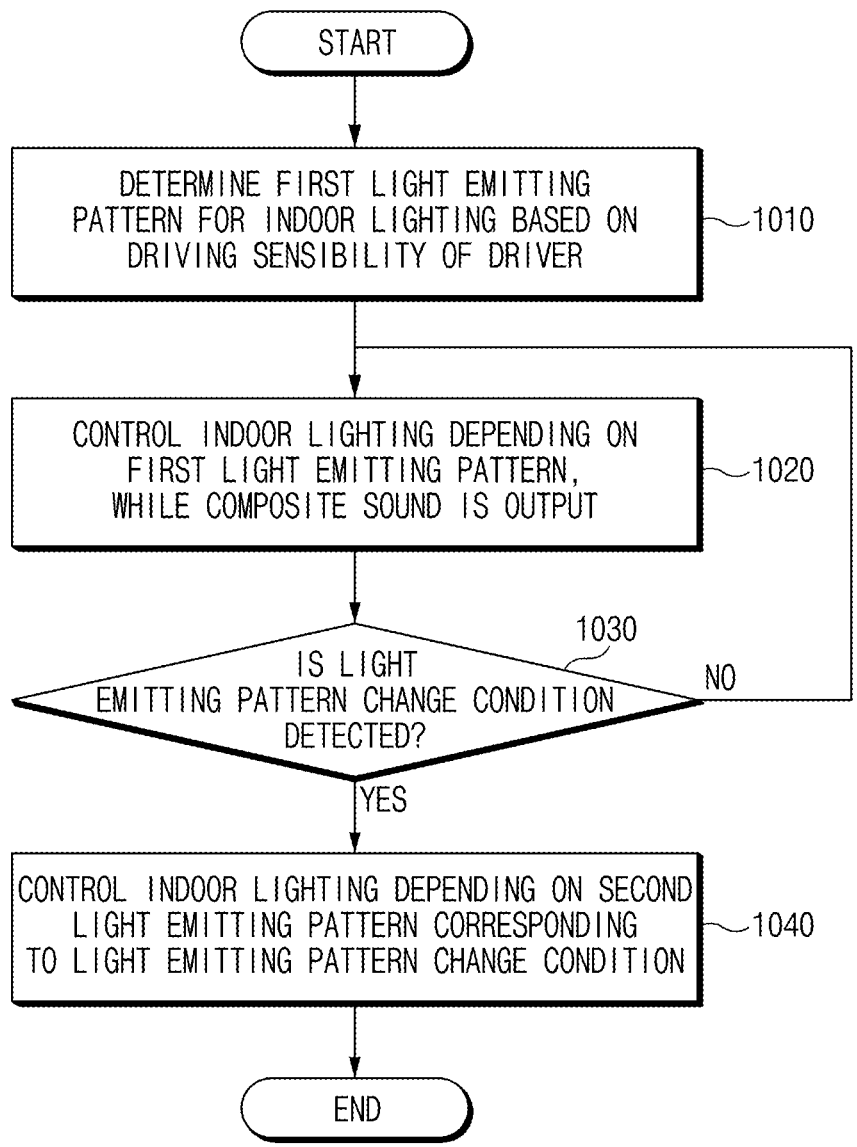
FIG. 10 is a flowchart illustrating another operation of outputting a composite sound in a virtual sound generation apparatus according to various embodiments.

FIG. 10 is a flowchart illustrating another operation of outputting a composite sound in a virtual sound generation apparatus according to various embodiments.

Operations of FIG. 10 described below may indicate various embodiments for operation 740 of FIG. 7. Respective operations in an embodiment below may be sequentially performed, but are not necessarily sequentially performed. For example, an order of the respective operations may be changed, and at least two operations may be performed in parallel. Furthermore, at least one of operations below may be omitted according to an embodiment.

Referring to FIG. 10, in operation 1010, a virtual sound generation apparatus 116 (or a processor 107) of FIG. 1 according to various embodiments may determine a first light emitting pattern for an indoor lighting based on driving sensibility of a passenger (e.g., a driver). The indoor lighting may be a mood lamp provided in a vehicle. Furthermore, the first light emitting pattern may include a light emitting color, a light emitting pattern, brightness, or the like of the indoor lighting.

According to various embodiments, in operation 1020, the virtual sound generation apparatus 116 (or the processor 107) may control the indoor lighting based on the first light emitting pattern, while a composite sound is output. According to an embodiment, the virtual sound generating apparatus 116 may control the indoor lighting, thus help the passenger to experience a stimulus by means of the composite sound. For example, while a composite sound which provides a comfortable and stable atmosphere is output, the virtual sound generation apparatus 116 may turn on the indoor lighting using brightness and a color corresponding to the composite sound.

According to various embodiments, in operation 1030, the driving force control apparatus 116 (or the processor 107) may determine whether a light emitting pattern change condition is detected. According to an embodiment, the light emitting pattern change condition may be a change in driving sensibility for the passenger according to the composite sound and light emitting of the indoor lighting.

For example, the case where there is no change in driving sensibility for the passenger may be a situation where the light emitting pattern change condition is not met. Furthermore, the case where there is a change in driving sensibility for the passenger may be a situation where the light emitting pattern change condition is met.

According to various embodiments, when the light emitting pattern change condition is not met, the virtual sound generation apparatus 116 (or the processor 107) may control the indoor lighting based on the first light emitting pattern, while the composite sound is output.

According to various embodiments, when the light emitting pattern change condition is met, in operation 1040, the virtual sound generation apparatus 116 (or the processor 107) may control the indoor lighting depending on a second light emitting pattern corresponding to the light emitting pattern change condition.

According to an embodiment, when it is determined that the passenger experiences the stimulus according to the driving sensibility, the virtual sound generation apparatus 116 may stop turning on the indoor lighting Furthermore, when there is the change in driving sensibility for the passenger, but it is determined that the passenger does not experience the stimulus according to the driving sensibility, the virtual sound generation apparatus 116 may change a light emitting pattern of the indoor lighting to guide the passenger to experience a stimulus.

Figure 11:
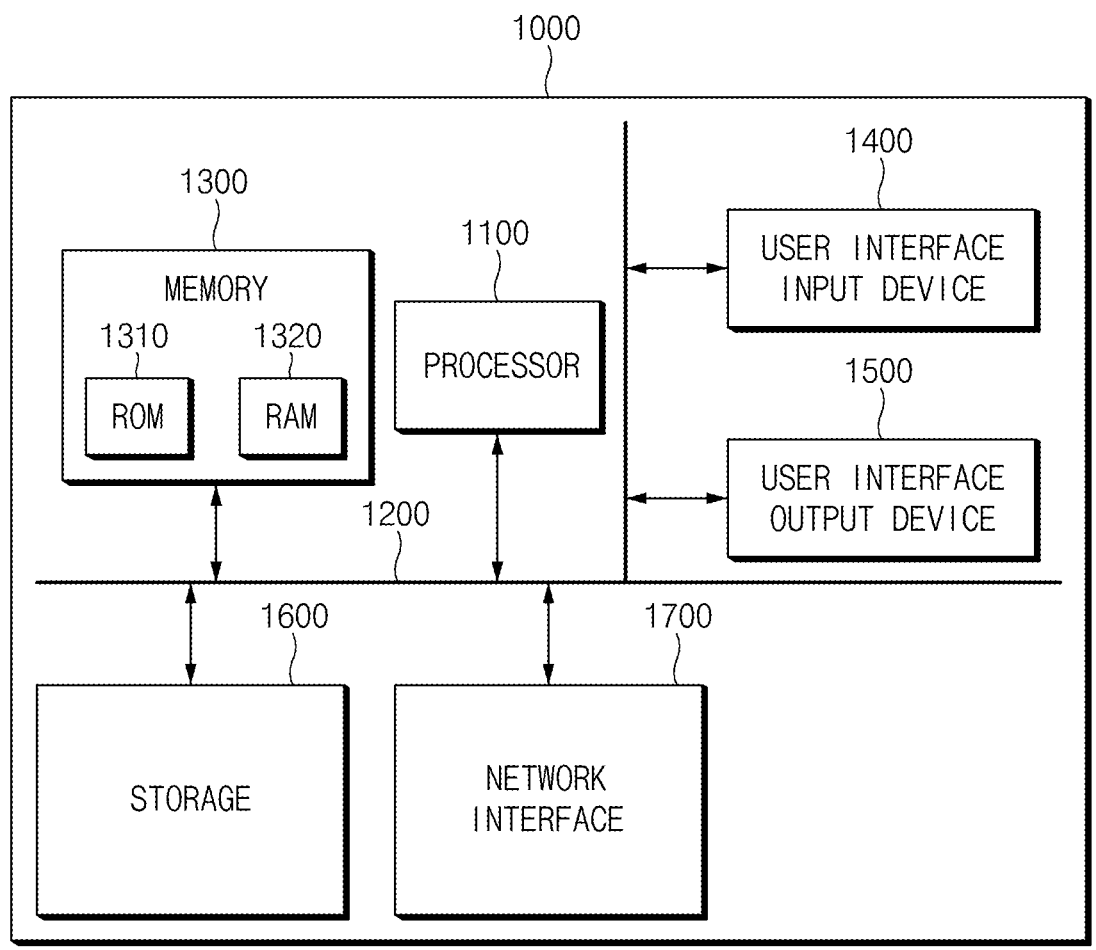
FIG. 11 is a block diagram illustrating a configuration of a computing system for executing the method according to an embodiment of the present disclosure.

FIG. 11 is a block diagram illustrating a configuration of a computing system for executing the method according to an embodiment of the present disclosure.

Referring to FIG. 11, a computing system 1100 may include at least one processor 1110, a memory 1130, a user interface input device 1140, a user interface output device 1150, storage 1160, and a network interface 1170, which are connected with each other via a bus 1120.

The processor 1110 may be a central processing unit (CPU) or a semiconductor device that processes instructions stored in the memory 1130 and/or the storage 1160. The memory 1130 and the storage 1160 may include various types of volatile or non-volatile storage media. For example, the memory 1130 may include a ROM (Read Only Memory) 1131 and a RAM (Random Access Memory) 1133.

Accordingly, the operations of the method or algorithm described in connection with the embodiments disclosed in the specification may be directly implemented with a hardware module, a software module, or a combination of the hardware module and the software module, which is executed by the processor 1110. The software module may reside on a storage medium (that is, the memory 1130 and/or the storage 1160) such as a RAM, a flash memory, a ROM, an EPROM, an EEPROM, a register, a hard disk, a removable disk, and a CD-ROM. The exemplary storage medium may be coupled to the processor 1110. The processor 1110 may read out information from the storage medium and may write information in the storage medium. Alternatively, the storage medium may be integrated with the processor 1110. The processor 1110 and the storage medium may reside in an application specific integrated circuit (ASIC). The ASIC may reside within a user terminal. In another case, the processor 1110 and the storage medium may reside in the user terminal as separate components.

The present technology may generate a virtual sound based on driving sensibility of a driver and a driving state of a vehicle, thus improving driving satisfaction of the driver.

Furthermore, the present technology may generate a sound to experience psychological stability or pleasure in generating the virtual sound, thus improving driving concentration of the driver.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A virtual sound generation apparatus, comprising:
   a first sensor configured to obtain biometric information about a passenger;
   an output device configured to output a virtual sound; and
   a processor electrically connected with the first sensor and the output device,
   wherein the processor is configured to:
   determine a driving sensibility for the passenger based on the biometric information obtained by the first sensor;
   generate an effect signal for guiding the passenger to be stimulated depending on the driving sensibility;
   control the output virtual sound based on the effect signal;
   determine whether the passenger experiences a stimulus based on information collected by the first sensor while the output of the virtual sound is controlled; and
   re-generate, when it is determined that the passenger does not experience the stimulus, the effect signal and control the output of the virtual sound based on the re-generated effect signal.

2. The virtual sound generation apparatus of claim 1, wherein the virtual sound comprises at least one of: a virtual engine sound of a vehicle and/or a guidance sound, the virtual sound providing a notification of an operation state of the vehicle.

3. The virtual sound generation apparatus of claim 1, further comprising:
   a memory configured to store a plurality of virtual sounds having different registers,
   wherein the processor is further configured to:
   synthesize at least one of the plurality of virtual sounds with the effect sound; and
   output a composite sound.

4. The virtual sound generation apparatus of claim 3, further comprising:
   a second sensor configured to collect information associated with a driving state of a vehicle,
   wherein the processor is further configured to:
   select at least one of the plurality of virtual sounds stored in the memory based on the information collected by the second sensor.

5. The virtual sound generation apparatus of claim 4, wherein the processor is further configured to:
   determine a result comprising at least one of: a low-speed driving environment, an acceleration driving environment, and/or a congestion section driving environment, based on the information collected by the second sensor;
   select at least one virtual sound corresponding to the determined result; and
   generate the effect signal based on the biometric information obtained while the at least one selected virtual sound is output.

6. The virtual sound generation apparatus of claim 4, wherein the processor is further configured to:
   determine a manipulation state of the passenger based on the information collected by the second sensor;
   select at least one virtual sound corresponding to the determined result; and
   generate the effect signal based on biometric information obtained while the selected at least one virtual sound is output.

7. The virtual sound generation apparatus of claim 1, wherein the first sensor comprises at least one of: a non-contact type electroencephalogram (EEG) sensor configured to obtain an EEG reading of the passenger, a heart rate sensor configured to measure a heart rate of the passenger, and/or a body temperature sensor configured to measure a body temperature of the passenger.

8. The virtual sound generation apparatus of claim 1, further comprising:
at least one indoor lighting feature,
wherein the processor is further configured to:
control, while the output of the virtual sound is being controlled, the at least one indoor lighting feature using a light emitting pattern corresponding to the driving sensibility.

9. A vehicle system, comprising:
a manipulation device comprising a steering input device, an acceleration input device, and a brake input device; and
a virtual sound generation apparatus electrically connected with the manipulation device,
wherein the virtual sound generation apparatus is configured to:
obtain biometric information about a passenger who controls the manipulation device;
determine at least one driving sensibility for the passenger based on the biometric information;
generate an effect signal for guiding the passenger to be stimulated depending on the driving sensibility;
control an output of a virtual sound based on the effect signal;
determine whether the passenger experiences a stimulus based on information collected by the first sensor while the output of the virtual sound is controlled; and
re-generate, when it is determined that the passenger does not experience the stimulus, the effect signal and control the output of the virtual sound based on the re-generated effect signal.

10. The vehicle system of claim 9, further comprising:
a memory configured to store a plurality of virtual sounds having different registers,
wherein the virtual sound generation apparatus is configured to:
select at least one virtual sound corresponding to a driving state of a vehicle; and
generate the effect signal based on the biometric information obtained while the virtual sound is output.

11. The vehicle system of claim 10, wherein the virtual sound generation apparatus is configured to:
determine a first driving sensibility based on the biometric information;
output a first effect signal while the virtual sound is being output, and when the first driving sensibility is determined;
determine a second driving sensibility based on the biometric information; and
output a second effect signal while the virtual sound is being output, and when the second driving sensibility is determined.

12. An operation method of a virtual sound generation apparatus, the operation method comprising:
obtaining biometric information about a passenger from a first sensor configured to collect the biometric information;
determining a driving sensibility for the passenger based on the obtained biometric information;
generating an effect signal for guiding the passenger to be stimulated depending on the driving sensibility;
controlling an output of a virtual sound based on the effect signal;
determining, based on information collected by the first sensor and while the output of the virtual sound is being controlled, whether the passenger experiences a stimulus;
re-generating the effect signal when it is determined that the passenger does not experience the stimulus; and
controlling the output of the virtual sound based on the re-generated effect signal.

13. The operation method of claim 12, wherein the virtual sound includes at least one of: a virtual engine sound of a vehicle and/or a guidance sound, the virtual sound providing a notification of an operation state of the vehicle.

14. The operation method of claim 12, further comprising:
synthesizing at least one of a plurality of virtual sounds having different registers with the effect signal, the plurality of virtual sounds being stored in a memory of the virtual sound generation apparatus; and
outputting a composite sound.

15. The operation method of claim 14, further comprising:
selecting at least one of the plurality of virtual sounds stored in the virtual sound generation apparatus, based on information collected by a second sensor configured to collect the information associated with a driving state of a vehicle.

16. The operation method of claim 15, further comprising:
determining, based on the information collected by the second sensor, at least one of: a low-speed driving environment, an acceleration driving environment, and/or a congestion section driving environment;
selecting at least one virtual sound corresponding to the determined result; and
generating, based on the biometric information obtained while the selected virtual sound is output, the effect signal.

17. The operation method of claim 15, further comprising:
determining, based on the information collected by the second sensor, a manipulation state of the passenger for the vehicle;
selecting at least one virtual sound corresponding to the determined result; and
generating, based on the biometric information obtained while the selected virtual sound is output, the effect signal.

18. The operation method of claim 12, further comprising:
controlling, while the output of the virtual sound is being controlled, at least one indoor lighting feature in a vehicle using a light emitting pattern corresponding to the driving sensibility.

* * * * *